United States Patent

Church et al.

[11] Patent Number: 5,926,169
[45] Date of Patent: Jul. 20, 1999

[54] COMPUTER WORK STATION WITH VOICE MESSAGING

[76] Inventors: Edward Church, 4015 Bayshore Blvd. Suite 14-D, Tampa, Fla. 33611; Sam E. J. Chan, Block 2, Yip on Factory Estate Kowloon, The Hong Kong Special Administrative Region of the People's Republic of China

[21] Appl. No.: 08/752,267

[22] Filed: Nov. 19, 1996

[51] Int. Cl.$^6$ .................................................. G09G 5/08
[52] U.S. Cl. ................................................. 345/163; 345/156
[58] Field of Search ............................... 345/156, 157, 345/158, 163, 167, 168, 169, 173, 179, 166; 178/18, 19; 704/201, 270; 248/346.01

[56] References Cited

U.S. PATENT DOCUMENTS

| | | | |
|---|---|---|---|
| 4,908,866 | 3/1990 | Goldwasser et al. | 381/44 |
| 5,107,343 | 4/1992 | Kawai | 358/341 |
| 5,402,518 | 3/1995 | Lowery | 704/201 |
| 5,457,480 | 10/1995 | White | 345/163 |
| 5,481,752 | 1/1996 | Suzuki et al. | 395/800 |
| 5,631,669 | 5/1997 | Stobbs et al. | 345/156 |

OTHER PUBLICATIONS

Image Storage Devices Inc., "How to turn good ideas into sound products," 1996, color brochure.
Good enough, "Single IC Stores and Plays Back 4 Minutes of Voice," Jul. 22, 1996, article in Electronic Design, vol. 44, No. 15, p. 67 et seq.
OKI Semiconductor, Inc., "MSM6688/6688L ADPCM Solid–state Recorder IC," data sheet.

*Primary Examiner*—Dennis-Doon Chow
*Attorney, Agent, or Firm*—Ken J. Pedersen; Barbara S. Pedersen

[57] ABSTRACT

A computer work station provides voice recording and playback without interruption of the user's working conditions, such as the appearance of the monitor screen, location of the user's hands over home positions, or direction of the user's gaze. A first work station embodiment includes a voice messaging mouse pad having a battery operated voice message module for record and playback using a microphone and speaker within the module. A second work station embodiment includes a voice messaging wrist rest that includes a similar battery operated voice messaging module. A third work station embodiment includes a voice messaging mouse that includes a similar battery powered voice messaging module.

2 Claims, 3 Drawing Sheets

COMPUTER WORK STATION WITH VOICE MESSAGING

BACKGROUND OF THE INVENTION

1. Field of the Invention

Embodiments of the present invention relate to computer work stations and to systems for voice messaging that otherwise serve as computer work station input devices.

2. Background of the Invention

As an introduction to problems solved by the present invention, consider the conventional computer work station operated by a skilled operator. The user operates such a work station by orienting his or her hand in relation to an input device such as a keyboard, mouse, touch pad, or digitizing pad. The user's gaze is directed toward a computer monitor that displays text and graphics for guiding the user further. While the user is concentrating on what is shown on the display, the user maintains his or her hand poised and positioned for further input without the inconvenience of having to direct his or her gaze toward his or her hand to reorient it. During concentration, the flow of ideas occurring to the user may be interrupted by an idea unrelated to operation of the computer system.

Conventional computer operating systems provide means for entering a typed note of the idea for further reference at another time. However, prior to entry of such a typed note, the computer monitor display is necessarily changed to show a context in which the typed note is entered and edited. Such a change in the display upsets the visual context that supported the original work prior to interruption. Returning to the original work display image may leave the user without memory of the position or content of the display which was the subject of prior concentration. Consequently, there is a loss of productivity associated with typing a note.

Other manual ways of recording the idea result in physical as well as visual disorientation for the user. Use of a nearby pencil and paper will require movement of the user's hand away from a home position on the keyboard, mouse, touch pad, or digitizing pad. A home position is a position of the user's hand relative to a home surface that provides tactile feedback. Keyboards with tactile feedback are conventionally arranged with keys for "F" and "J" identified, for example, by a different sculpture or a raised bump. Such features distinguish these keys from other keys and so identify a home position for the user's index fingers. Other input devices have home surfaces, too. Operation of a keyboard, as well as other input devices, usually requires directing the gaze toward the input device as the user's hand is placed to recognize the home surface. Thus, time is required to overcome the physical disorientation that precedes returning to a home position. Once in position, returning to the memory of the original work will consume additional time.

Time spent away from the original work raises the cost of the work. Beyond a mere lack of convenience is the risk that an analysis associated with the original work may be incomplete or forgotten. And, if the idea that is to be noted is not noted promptly, this idea may be lost as well.

In view of the problems described above and related problems that consequently become apparent to those skilled in the applicable arts, the need remains in computer work stations for messaging systems that avoid visual interruption and physical disorientation while recording ideas possibly unrelated to computer system operation.

SUMMARY OF THE INVENTION

Accordingly, a work station in one embodiment of the present invention includes a computer system and an input system. The input system controls operation of the computer system. The input system has a home surface that provides tactile feedback to the user who, in response to the feedback, maintains her hand near the home surface during operation of the input system by her hand. The input system includes a recorder that records speech by the user and a switch that starts the recorder. The switch is operated by the user's hand while the user maintains orientation of the user's hand near the home surface.

According to a first aspect of the operation of such a work station, the user avoids visual interruption and physical disorientation while recording speech possibly unrelated to computer system operation.

According to another aspect, recording an idea using speech does not require departing from the visual and physiological context of the work on screen. The act of returning to the original work is less likely to result in loss of the original analysis or train of thought. Consequently, productivity improves.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE INVENTION

Figure 1:
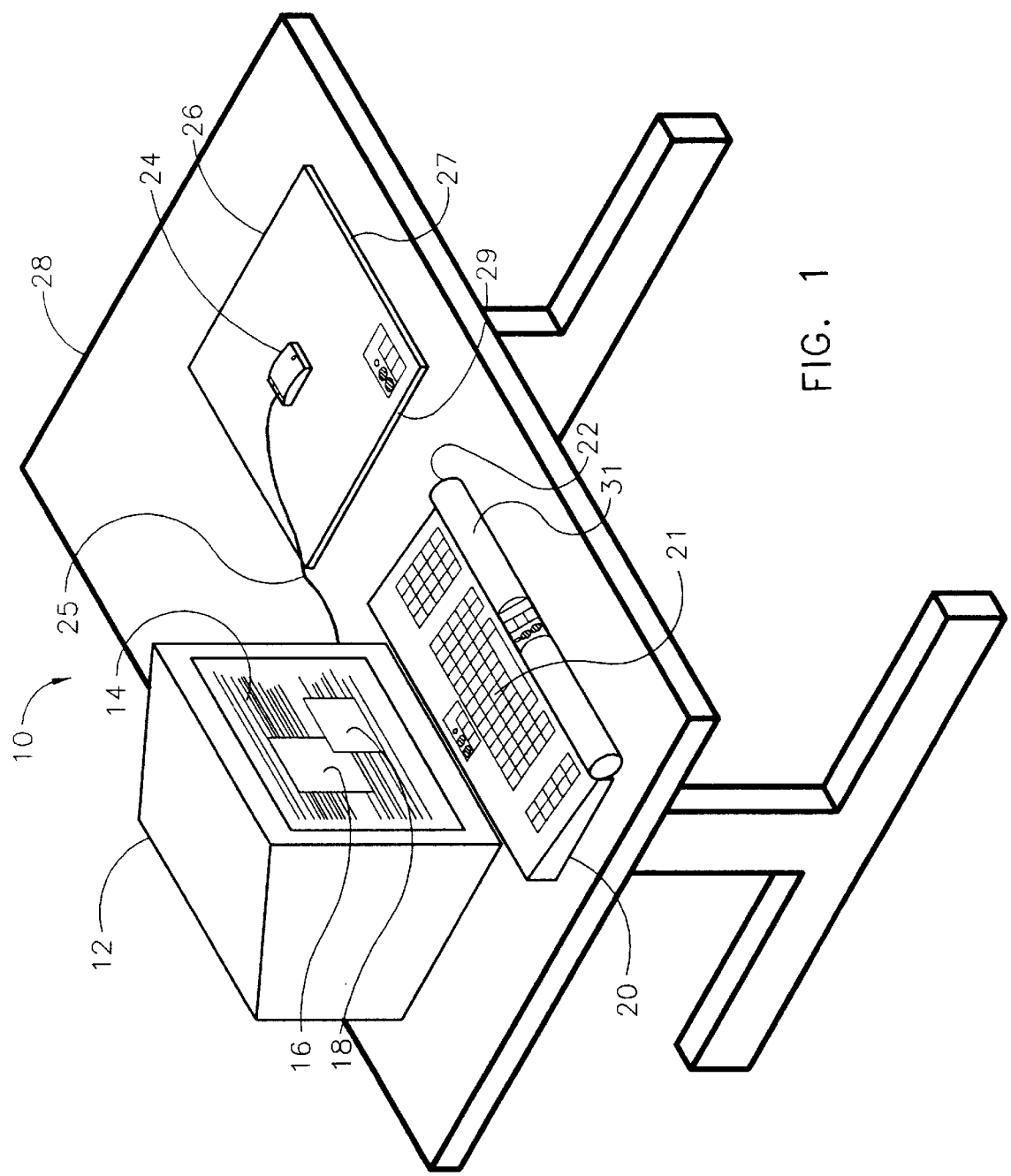
FIG. 1 is a perspective view of a work station that illustrates a few embodiments of the present invention.

FIG. 1 is a perspective view of a work station that illustrates several embodiments of the present invention. Work station 10 includes computer 12, voice messaging keyboard 20, voice messaging wrist rest 22, voice messaging mouse 24, voice messaging mouse pad 26, and table 28. Ordinarily one work station component having voice messaging capability would be sufficient; however, work station 10 is illustrated with four such components (20, 22, 24, and 26) for ease of description.

Computer 12 and table 28 are of conventional construction and function. Computer 12 provides display 14 by operation of its conventional operating system and repertoire of conventional application programs. Such programs conventionally provide overlapping display regions in which the context of data entry and control is identified to one particular task. Several tasks may be controllable by user input as indicated by the conventional background dialog box 16 and the conventional foreground dialog box 18. Dialog boxes 16 and 18 represent generally the visually sophisticated computing environment in which the ordinary user works.

A user would ordinarily sit in front of table 28 and place his/her right hand in a conventional manner either on keyboard 20, resting the base of the hand on wrist rest 22, or place the right hand on mouse 24. The left hand would be placed in a conventional manner on keyboard 20, resting the base of it on wrist rest 22. Prior to operation the user would find the home surface under each hand and throughout use, attempt to maintain each hand near the respective home surface either touching on it, hovering over it, or stretching within a vicinity of the home surface that permits quick and accurate return to the home surface without visual guidance toward, or confirmation of, its location.

According to a method of the present invention, the user, while operating computer system 12 for producing a work product, and having at least one hand near a home surface, realizes an idea possibly unrelated to the control of computer system 12. To assure that the idea receives attention in due course, the user records a voice message by (1) operating a switch that is located within reach from the home surface and (2) speaking a description of the idea so that the description is recorded. With the image of the work product unchanged on computer display 14 and the orientation of his or her hand near the home surface, the user quickly returns to productive work without substantial loss of train of thought or time or both.

In another embodiment of the present invention, the method further includes the steps of (1) observing a display indicating that a message has been recorded, and (2) operating a switch that is located within reach from the respective home surface to initiate audible play back of the message.

Figure 2:
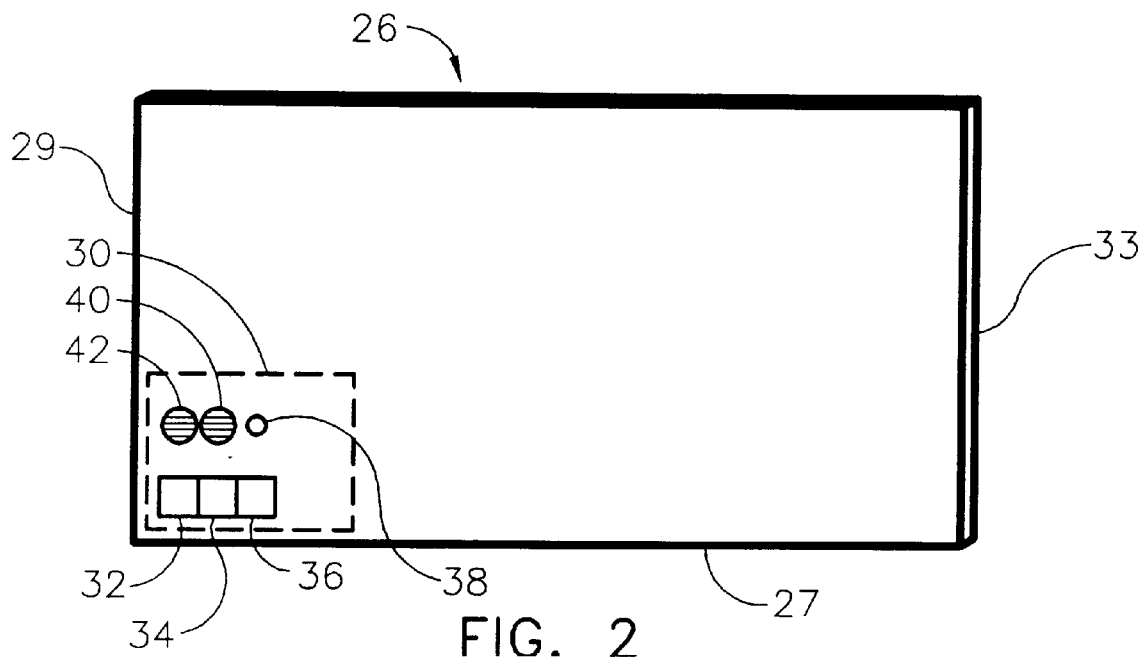
FIG. 2 is a top view of the mouse pad shown in FIG. 1.

FIG. 2 is a top view of the mouse pad shown in FIG. 1. Voice messaging mouse pad 26 includes home surfaces 27 and 29, base 33, and battery powered module 30. Base 33 is of conventional foam laminate construction having a top surface for operating the rolling ball of a conventional mouse. Home surfaces 27 and 29 provide tactile orientation for quick identification of switches 32, 34, and 36 on module 30. Display 38 in the illustrated embodiment is a light emitting diode that indicates that a message has been recorded. Electret microphone 40 receives the user's speech and provides a corresponding electrical signal to an integrated circuit for recording. The integrated circuit provides a drive signal to speaker 40 so that the recorded message is audible during play back.

Module 30 is embedded by conventional techniques in a void in base 33. The top surface of the pad is made uniform so that movement of a conventional mouse over module 30 does not interfere with operation of the mouse or activate module 30. By locating module 30 in a void, the thickness of voice messaging mouse pad 26 does not exceed conventional mouse pad thickness. Access to a battery, not shown, that supplies power to module 30 is provided on the back face of pad 26 in a conventional manner.

Module 30 is an electronic subassembly of the type described in "Data Book—Voice Recording & Playback ICs" 1996, by Information Storage Devices, Inc., of San Jose, Calif., U.S.A., incorporated in full herein by this reference. The ISD1100 integrated circuit is used in a preferred embodiment. The integrated circuit (not shown), switch 32 (PLAYL), switch 34 (PLAYE), switch 36 (REC), microphone 42, speaker 40, LED (RECLED) 38, and battery (not shown) form a circuit of the type described by the schematic diagram at page 1–35. The circuit is conventionally assembled on a circuit board, according to layout design practices described on pages 3–75 through 3–80. Preferred component values are described on the schematic, on page 3–21, and pages 3–83 through 3–87. Functionally similar components, known by those of ordinary skill in the art, and component values selected for various conventional specific applications are used in equivalent embodiments. For example, an alternate and equivalent module embodiment includes a circuit of the type described in "MSM6688/6688L ADPCM Solid-State Recorder IC Datasheet" by OKI Semiconductor, Inc., of Sunnyvale, Calif., U.S.A., incorporated herein by this reference.

Figure 3:
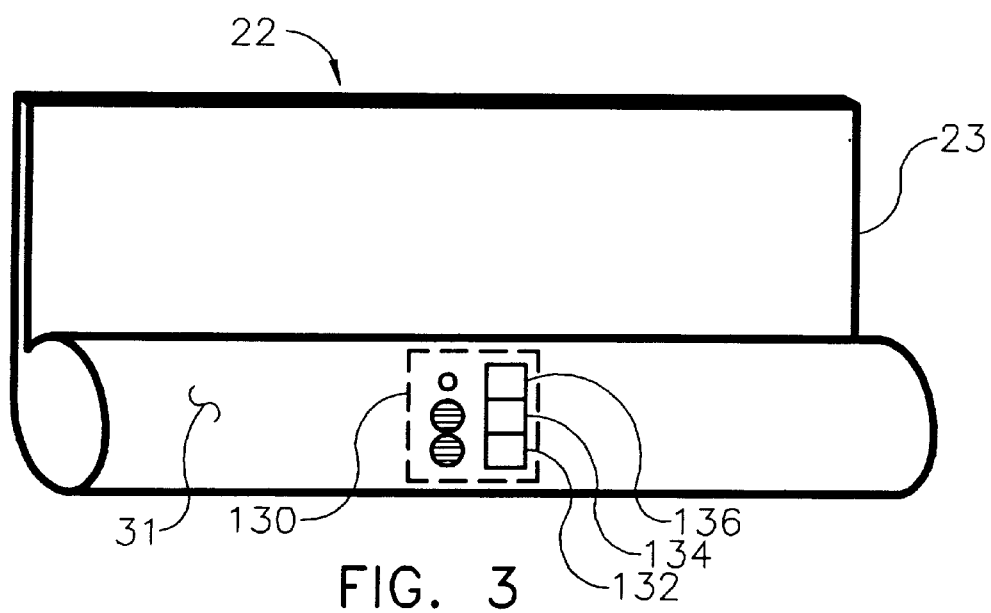
FIG. 3 is a top view of the wrist rest shown in FIG. 1.

FIG. 3 is a top view of the wrist rest shown in FIG. 1. Voice messaging wrist rest 22 includes base 23, home surface 31, and battery powered module 130. Base 23 is of the conventional type of wrist rest formed of fabric covered foam. Module 130 is structurally and functionally similar to module 30 in FIG. 2. Module 130 is embedded by conventional technique in a void in base 23. Features of module 130 correspond to features of module 30, numbered less one hundred. The switches 132, 134, and 136 on module 130 are accurately located without visual guidance or confirmation and operated, for example, by the user's thumb while the user's index finger remains near home key "J" having home surface 21 on keyboard 20. Home surface 31, where the base of the user's hand or wrist rests during operation of keyboard 20, serves as an alternate home surface for reference during operation of switches 132, 134, and 136.

Figure 4:
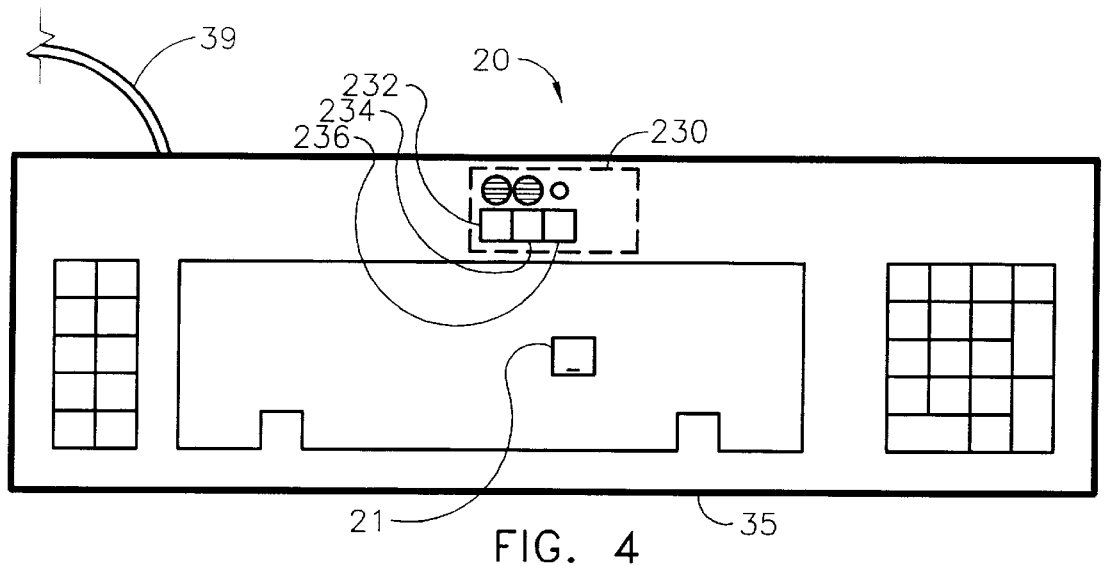
FIG. 4 is a top view of the keyboard shown in FIG. 1.

FIG. 4 is a top view of the keyboard shown in FIG. 1. Voice messaging keyboard 20 includes keyboard assembly 35 and battery powered module 230. Module 230 is structurally and functionally identical to module 30 in FIG. 2. Features of module 230 correspond to features of module 30, numbered less two hundred. Keyboard assembly 35 is of the conventional type used with a conventional personal computer. Module 230 is embedded by conventional technique in a void in keyboard assembly 35. Signals responsive to keyboard keys pressed by the user are coupled to computer system 12 by cable 39. Module 230 is located to be within reach of the index finger of the user's right hand without losing orientation with the home key 21 and home surface thereon.

Figure 5:
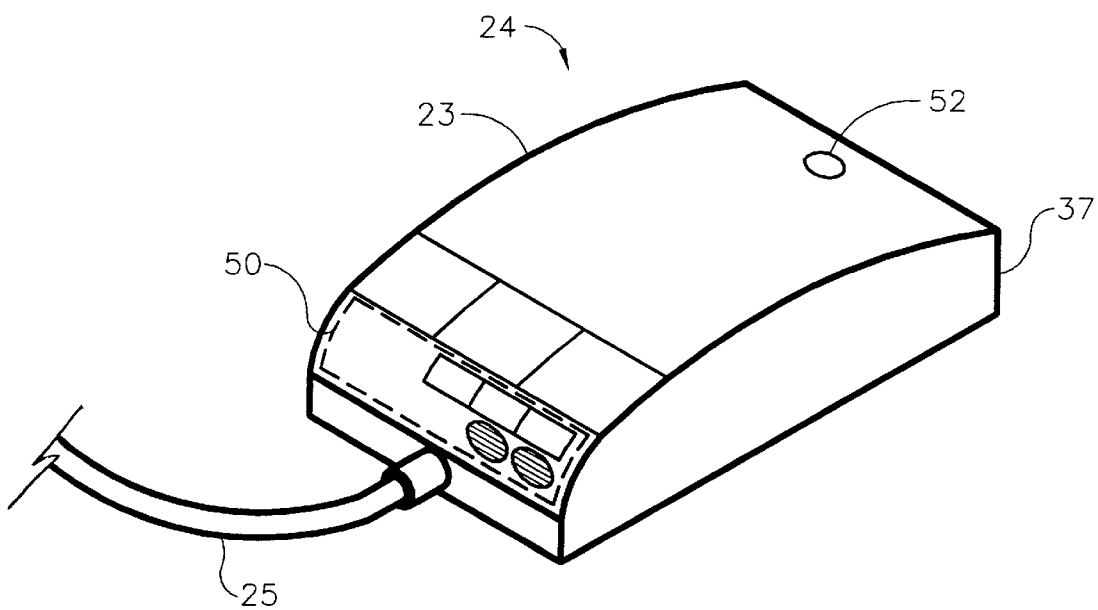
FIG. 5 is a perspective view of the mouse shown in FIG. 1.

FIG. 5 is a perspective view of the mouse shown in FIG. 1. Voice messaging mouse 24 includes mouse assembly 37, home surface 23, and battery powered module 50. Mouse assembly 37 is of the conventional type used with a conventional personal computer. An internal ball (not shown) protrudes from the underside of mouse assembly 37 to roll against a conventional mouse pad or equivalent surface. Signals responsive to movement of the ball are coupled to computer system 12 by cable 25. The construction and function of module 50 is identical to battery powered module 30 except that LED 52 and appropriate wiring is substituted for LED 38. By locating LED 52 away from module 50, LED 52 is made more noticeable by the user.

The foregoing description discusses preferred embodiments of the present invention, which may be changed or modified without departing from the scope of the present invention.

For example, those skilled in the art will understand that in alternate module embodiments power for the module (similar to module 230 or 50) is supplied by power conducted to the work station component wherein the module is located. For example, in an alternate embodiment of voice messaging keyboard 20, the module is powered by signals received from computer 12 on cable 39. In an alternate embodiment of voice messaging mouse 24, the module is powered by signals received from computer 12 on cable 25.

Further, those skilled in the art will understand that in alternate embodiments, the location of switches, microphone, speaker, battery, and indicators varies by design choice. Some or all of these components are recessed in various embodiments to reduce the possibility of unintentional activation of module functions or interference with conventional operations and movements. More sophisticated embodiments include additional similar switches for additional functions including, for example, erasing one or more previously recorded messages, activating one or more messages for periodic playback, recording additional messages with or without replacing previously recorded messages, playing back only part of a message, selecting any of several messages for immediate playback, skipping the remainder of a message after playback of that message has begun. Additional further embodiments include additional similar indicators for additional display functions including, for example, modes of operation, status of recorded messages, and the remaining capacity of battery and voice storage memory.

These and other changes and modifications are intended to be included within the scope of the present invention.

While for the sake of clarity and ease of description, several specific embodiments of the invention have been described; the scope of the invention is intended to be measured by the claims as set forth below. The description is not intended to be exhaustive or to limit the invention to the form disclosed. Other embodiments of the invention will be apparent in light of the disclosure to one of ordinary skill in the art to which the invention applies.

The words and phrases used in the claims are intended to be broadly construed. A "system" refers generally to electrical apparatus and includes but is not limited to electromechanical components in combination with a packaged integrated circuit, an unpackaged integrated circuit, a combination of packaged or unpackaged integrated circuits or both, a microprocessor, a microcontroller, a memory, a register, a flip-flop, a charge-coupled device, combinations thereof, and equivalents.

The conventional mouse, joy stick, track ball, touch pad, digitizing tablet, and pen input tablet are but a few examples of equivalent pointing systems. Equivalent pointing systems of the present invention include any of these conventional devices and their functional equivalents combined with battery powered module 30, battery powered module 50, or an equivalent module powered by computer system 12 as discussed above.

An input system in a first embodiment includes a pointing system as discussed above. Alternate and equivalent input systems include a conventional keyboard and other conventional switching apparatus designed with varying arrangement of keys for lower operator fatigue and higher accuracy.

Equivalent input systems of the present invention include any of these conventional devices and their functional equivalents combined with battery powered module 30, battery powered module 50, or an equivalent module powered by computer system 12 as discussed above.

Although this invention has been described above with reference to particular means, materials and embodiments, it is to be understood that the invention is not limited to these disclosed particulars, but extends instead to all equivalents within the scope of the following claims.

What is claimed is:

1. A work station operated by a hand of a user, the station comprising:

a. a computer system which displays a cursor; and b. an input system that controls operation of the computer system, the input system comprising a pad and a mouse operated on the pad, the pad having a home surface that provides tactile feedback to the user who, in response to the feedback, maintains the user's hand near the home surface during operation of the input system by the user's hand, the input system further comprising:

(1) a recorder in the pad that records speech by the user, said recorder being a battery-powered voice recording and playback integrated circuit subassembly; and (2) a switch also in the pad that starts the recorder, the switch operated by the user's hand while the user maintains orientation of the user's hand near the home surface, whereby the user avoids visual interruption and physical disorientation while recording speech possibly unrelated to computer system operation.

2. A mouse pad over which a hand of a user operates a provided computer system, the pad comprising:

a. a home surface that provides tactile feedback to the user who, in response to the feedback, maintains the user's hand near the home surface during operation of the computer system by the user's hand;

b. a battery-powered speech recorder, said recorder being a voice recording and playback integrated circuit subassembly; and c. a switch that starts the recorder, the switch operated by the user's hand while the user maintains orientation of the user's hand near the home surface, whereby the user avoids visual interruption and physical disorientation while recording speech possibly unrelated to computer system operation.

\* \* \* \* \*